UNITED STATES PATENT OFFICE.

CHARLES H. MacDOWELL, OF CHICAGO, ILLINOIS, AND HERBERT H. MEYERS, OF PITTSBURGH, PENNSYLVANIA, ASSIGNORS TO ARMOUR FERTILIZER WORKS, OF CHICAGO, ILLINOIS, A CORPORATION OF NEW JERSEY.

MANUFACTURE OF SULPHURIC ACID.

1,420,202.   Specification of Letters Patent.   Patented June 20, 1922.

No Drawing.   Application filed January 20, 1919. Serial No. 272,154.

*To all whom it may concern:*

Be it known that we, CHARLES H. MAC-DOWELL and HERBERT H. MEYERS, both citizens of the United States, and residents, respectively, of Chicago, county of Cook, State of Illinois, and Pittsburgh, county of Allegheny, State of Pennsylvania, have invented certain new and useful Improvements in the Manufacture of Sulphuric Acid; and we do hereby declare the following to be a full, clear, and exact description of the invention, such as will enable others skilled in the art to which it appertains to make and use the same.

This invention relates to the catalytic oxidation of sulfur dioxide, and has for its object the provision of an improved method of effecting the catalytic production of sulfur trioxide by the oxidation of sulfur dioxide.

In the contact or catalytic method of producing sulfur trioxide, and sulphuric acid, numerous catalysts or contact substances have been proposed. However, as far as we are aware, only platinum and iron oxide have heretofore been found commercially practicable. The former, despite its cost, is the most successful and widely used catalytic material, for the reason that it is possible to produce practically quantitative yields with it and, with proper precautions, its life as a catalyst is indefinitely long. Iron oxde, as a catalyst, is generally used in the form of iron pyrite cinder and, as such, is a by-product of the complete process, being produced when iron pyrites are burned to generate the necessary sulfur dioxide gas. Since the yields obtainable with iron oxide are comparatively low, it is practically always used in conjunction with platinum or in conjunction with a chamber system for producing sulphuric acid.

The possibilities of using certain vanadium compounds as catalytic agents have long been recognized, but so far as we are aware this matter has heretofore been very largely regarded in the light of an interesting scientific phenomenon, and little, if any, effort has been made for effectively utilizing this property of vanadium compounds.

In a co-pending application filed concurrently herewith, Serial No. 272,155 we have described an improved composite catalyst containing vanadium. In its preferred form this composite catalyst comprises an intimate mixture of vanadium oxide and alumina resulting from the calcination and leaching of alunite. As explained in the aforementioned application, alumina from other sources may be used with good results, and the vanadium oxide may be obtained in a variety of ways and from various sources. The present invention involves the catalytic oxidation of sulphur dioxide by bringing a gaseous mixture containing sulphur dioxide and oxygen into contact with the improved composite catalyst described in the aforementioned application.

The catalyst employed in carrying out the method of the present invention is, in its broad aspect, made up of a compound of vanadium and a compound of aluminum in which each compound contributes to the catalytic activity. The aluminum compound performs a double function in the catalyst, since, in addition to possessing catalytic properties itself, it serves as a very effective carrier for the vanadium compound. The vanadium is preferably present in the composite catalyst as an oxide, and more particularly the pentoxide ($Va_2O_5$). As the compound of aluminum we prefer to use the oxide, that is alumina. However, other compounds of aluminum possessing catalytic properties may be used in admixture with the vanadium compound, and we have found the mineral alunite, which is a hydrated double sulphate of aluminum and potassium, suitable for admixture with vanadium oxide in our improved composite catalyst.

As far as we have been able to determine, any form of alumina, such for example, as alumina from bauxite, or precipitated alumina, performs the double role of catalytic agent and carrier for the vanadium compound, but we have found the alumina resulting from the leaching out of the soluble potassium salts from calcined alunite to be particularly well suited for these purposes. The alumina from calcined alunite is itself an effective catalyst for the production of contact sulphuric acid, and its use alone enables a conversion of from 50–60% to be obtained. When used in admixture with vanadium oxide, the alumina still exerts its catalytic action, while serving at the same time to give to the vanadium oxide an increased volume and correspondingly improved catalytic action. As a result, the composite catalyst enables a high conversion of sulphur dioxide to sulphur trioxide to be effected, for example, up to around 87%, or even higher.

The composite catalyst employed in carrying out the present invention preferably contains vanadium oxide and alumina from alunite in the proportions of about 10% of vanadium oxide and 90% of alumina. The alumina from alunite is a particularly advantageous form of alumina for use in the production of the composite catalyzer. Such alumina is readily obtainable at low expense and in large amount by the calcination of alunite and the leaching of the calcine. This calcination and leaching operation involves the separation from the original alunite of a large proportion of water-soluble material, but this separation takes place without a corresponding decrease in volume of the remaining alumina, and, in fact, this alumina remains of nearly the original volume of the alunite. The alumina from alunite is moreover of an exceedingly porous character, and it is of such a fine state of subdivision that it will for the most part go through a 200-mesh sieve. It is furthermore well adapted for admixture with vanadium compounds and for subsequent molding and formation into briquettes, as hereinafter described.

One of the advantages of the platinum process of producing contact sulphuric acid resides in the fact that a short time of contact of the reacting gases suffices for the nearly complete conversion of the sulfur dioxide into sulfur trioxide. The catalytic action of vanadium oxide is much slower than that of platinum, and therefore a correspondingly longer contact of the reacting gases with the catalytic body, or a correspondingly larger volume of catalyst so that the necessary contact may be secured during the passage of the gaseous mixture therethrough, is necessary. In the composite catalyst herein described, the vanadium oxide is intimately distributed or diffused throughout the alumina, and owing to the exceedingly porous character of the alumina there is presented a large amount of active surface to the reacting gases. Inasmuch as alumina from alunite is readily available in large amount and forms the greater portion of the composite catalyst, a large volume of catalyst can be provided at small cost and of high catalytic activity, so that a sufficiently prolonged period of contact of the reacting gases therewith can be provided without objectionable decrease in the rate of flow of such gases.

The composite catalyst of vanadium oxide and alumina can be prepared in various ways. Thus, for example, a satisfactory catalyst can be prepared by mixing about ten parts of ammonium vanadate very intimately with about one hundred parts of alumina obtained by the calcination and extraction of alunite. The mixture is moistened with just enough water to permit of molding and is then briquetted into suitable shapes. These briquettes are first air-dried, and then heated under suitable conditions to decompose the ammonium vanadate and form vanadium oxide (vanadium pentoxide). The heating of the dried briquettes can be effected in the catalytic apparatus in which the resulting catalyst is to be employed, as, for example, in the apparatus to be used in the catalytic oxidation of ammonia, or in the apparatus to be used for the manufacture of contact sulphuric acid, the resulting composite catalyst being well adapted for use in each of these processes.

Instead of employing vanadium compounds, such as ammonium vanadate, as the source of vanadium oxide, vanadium ores, if of proper composition, may be employed in the production of a composite catalyst for the catalytic oxidation of sulfur dioxide. The vanadium ores which we have used to advantage in this connection contain an amount of vanadium corresponding to about 30% vanadium pentoxide together with small amounts of various substances, such as nickel, molybdenum, iron, aluminum, etc., in an oxidized state, and usually small amounts of sulfur and carbonaceous material, as well as insoluble gangue usually of silicious character. Where sulfide ores are used, they are first roasted, and the roasted ore may contain a mixture of various oxides of vanadium besides the pentoxide.

The vanadium ore is ground to a fineness corresponding to about 100-mesh, or finer, and intimately mixed with about once or twice its weight of very fine alumina from calcined alunite, sufficient water being added to form a thick paste or plastic mass, which will permit handling and molding. This mixture is then molded without any added binder under just enough pressure so that the molded briquette will hold together and stand handling. The briquettes are air-dried and are then ready to be charged into the catalytic apparatus, such as the conversion tower for the catalytic production of sulphuric acid. The dried briquettes are gradually heated, usually during a period of several hours, to bring them to a working temperature and to bring about the conversion of lower oxides of vanadium into pentoxide and the separation of certain other ingredients, such as, for example, carbonaceous material. During this heating air is blown through in order to drive off the moisture and to assist in the oxidation.

Other sources of vanadium than the raw ore may be used in preparing the composite catalyst. Thus, vanadium oxide and vanadic acid by-products from the treatment of carnotite ores for their radium contents answer the purpose exceedingly well. As a matter of fact, any source of vanadium, such as the raw ore and concentrates of various kinds and metallurgical by-products containing a sufficiently high vanadium content to give the composite catalyzer the requisite amount of vanadium pentoxide, may be satisfactorily used. For instance, with a raw ore running 30% $V_2O_5$, we would use a mixture of 50% ore and 50% of alumina residue from the leaching of calcined alunite. With a by-product running 85% $V_2O_5$ we would use a mixture giving about 10% $V_2O_5$ in the finished catalyst. While we have found that the presence of about 10% of vanadium-pentoxide in the improved catalyst gives very satisfactory results, we do not intend to limit ourselves to this particular percentage, since, as pointed out in our aforementioned application, the percentage of the vanadium, as well as the aluminum compound, can be varied.

In carrying out the process of the present invention, sulfur dioxide gas in proper admixture with air, or other suitable oxidizing gas, is passed into contact with the composite catalyzer at a temperature appropriate to the catalytic production of sulfur trioxide, for example, at a temperature of about 540-575 degrees C. For a considerable time the sulfur dioxide passed into contact with the composite catalyzer is all absorbed thereby, due, as we believe, to the absorbent or adsorbent action of the alumina upon the sulfur dioxide. Upon the further passage of sulfur dioxide mixed with air into contact with the composite catalyst, and after absorption or adsorption to saturation has taken place, the formation and escape of sulfur trioxide takes place. The action of the composite catalyst accordingly seems to involve the accumulation of sulfur dioxide therein as a preliminary to, or as an adjunct of, catalytic oxidation. In fact, in the operation of the process there is a tendency for the absorption of sulfur dioxide and the evolution of sulfur trioxide to take place in more or less separate and successive phases, although by proper regulation of the temperature an approximately constant catalytic oxidation can be effected.

We prefer to carry out the catalytic oxidation of sulfur dioxide to sulfur trioxide at a temperature of about 550 degrees C. The heating of the catalytic body may be effected directly by the hot gases from the sulfur dioxide generator, or preheating of the reacting gases may be resorted to. The heat of reaction will help to maintain the desired temperature. The air employed for the oxidation is preferably well dried, for example with sulfuric acid. The catalytic process is improved by operating under a pressure somewhat above the atmospheric pressure.

We claim:

1. The method of effecting the oxidation of sulfur dioxide which comprises bringing a gaseous mixture containing sulfur dioxide and oxygen into contact with a composite catalyst containing vanadium oxide and alumina at a temperature appropriate to the catalytic production of sulfur trioxide.

2. The method of making sulfur trioxide by the contact process which comprises bringing a gaseous mixture containing sulfur dioxide and oxygen at a temperature from about 540 to about 575 degrees C. into contact with a composite catalyst containing alumina and a compound of vanadium.

3. The method of making sulfur trioxide by the contact process which comprises bringing a gaseous mixture containing sulfur dioxide and oxygen at a temperature appropriate to the catalytic production of sulfur trioxide into contact with a composite catalyst containing a compound of vanadium and alumina obtained from calcined alunite.

4. The method of making sulfur trioxide by the contact process which comprises bringing a gaseous mixture containing sulfur dioxide and oxygen at a temperature of around 550 degrees C. into contact with a composite catalyst containing vanadium oxide and alumina obtained from calcined alunite.

5. The method of making sulfur trioxide by the contact process which comprises bringing a gaseous mixture containing sulfur dioxide and oxygen at a temperature appropriate to the catalytic production of sulfur trioxide into contact with a composite catalyst containing a compound of vanadium and a compound of aluminum in which each compound contributes to the catalytic activity.

6. The method of effecting the oxidation of sulfur dioxide which comprises bringing a mixture of sulfur dioxide and an appropriate oxidizing agent, into contact with a composite catalyst made up of vanadium oxide and alumina at a temperature of around 550 degrees C.

In testimony whereof we affix our signatures.

CHARLES H. MacDOWELL.
HERBERT H. MEYERS.